United States Patent
Taniguchi et al.

(10) Patent No.: US 10,640,014 B2
(45) Date of Patent: May 5, 2020

(54) VEHICLE SEAT SLIDING DEVICE

(71) Applicant: SHIROKI CORPORATION, Fujisawa-shi, Kanagawa (JP)

(72) Inventors: Mitsugu Taniguchi, Kanagawa (JP); Yuta Murakami, Nagoya (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 16/185,480

(22) Filed: Nov. 9, 2018

(65) Prior Publication Data
US 2019/0143847 A1    May 16, 2019

(30) Foreign Application Priority Data
Nov. 15, 2017  (JP) .................................. 2017-220457

(51) Int. Cl.
 *F16M 13/00* (2006.01)
 *B60N 2/06* (2006.01)
 *B60N 2/07* (2006.01)

(52) U.S. Cl.
CPC ........... *B60N 2/067* (2013.01); *B60N 2/0722* (2013.01)

(58) Field of Classification Search
CPC ........ B60N 2/067; B60N 2/0232; F16H 25/20
See application file for complete search history.

(56) References Cited

U.S. PATENT DOCUMENTS

| | | | |
|---|---|---|---|
| 7,665,704 B2 * | 2/2010 | Koumura | B60N 2/067 248/430 |
| 8,226,063 B2 * | 7/2012 | Weber | B60N 2/067 248/429 |
| 2004/0012236 A1 * | 1/2004 | Mallard | B60N 2/0228 297/344.1 |
| 2019/0100118 A1 * | 4/2019 | Rey | B60N 2/067 |

FOREIGN PATENT DOCUMENTS

JP    2007-055557 A    3/2007

* cited by examiner

*Primary Examiner* — Amy J. Sterling
(74) *Attorney, Agent, or Firm* — Buchanan Ingersoll & Rooney PC (57) ABSTRACT

According to an embodiment, a vehicle seat sliding device includes a rotary member that integrally rotates with a screw rod, a swinging member that is supported on an upper rail in a manner capable of swinging in a state in which the rotation around a rotational center is restricted and that rotatively supports the rotary member and integrally swings with the rotary member, and receiving members that are fixed to a lower rail and support the swinging member in a manner capable of swinging.

10 Claims, 8 Drawing Sheets

VEHICLE SEAT SLIDING DEVICE

CROSS-REFERENCE TO RELATED APPLICATIONS

This application is based upon and claims the benefit of priority from Japanese Patent Application No. 2017-220457, filed Nov. 15, 2017, the entire contents of which are incorporated herein by reference.

FIELD

An embodiment described herein relates generally to a vehicle seat sliding device.

BACKGROUND

Conventionally, a vehicle seat sliding device that includes a lower rail that is fixed to a floor of a vehicle and extending in the vehicle front-and-rear direction, and an upper rail that is fixed to a vehicle seat and is assembled to be slidable to the lower rail has been known (Japanese Laid-open Patent Publication No. 2007-055557). In Japanese Laid-open Patent Publication No. 2007-055557, a screw member including a male screw that meshes with a female screw of a nut member fixed to the lower rail is provided on the upper rail, and as the screw member rotates, the upper rail slides with respect to the lower rail. The distal end portion of the screw member is rotatively inserted to a through hole of a supporting member fixed to the upper rail and provided with the through hole and is supported suppressing the vibration of the screw member due to the rotation.

However, there has been a problem in that, when the screw member is curved along the axial direction, the crossing angle of the central axis of the distal end portion of the screw member and the central axis of the through hole of the supporting member gets larger, and the screw member gets difficult to rotate smoothly as the screw member bites into the supporting member, thereby making it difficult to slide the seat smoothly with respect to the floor.

Thus, one of the problems of the present invention is, for example, to obtain a vehicle seat sliding device of a novel configuration that is capable of sliding the seat more smoothly with respect to the floor as the screw member rotates smoothly.

SUMMARY

According to an embodiment, A vehicle seat sliding device includes a lower rail, an upper rail, a male screw member, a female screw member, a rotary member, a swinging member, and a receiving member. The lower rail is fixed to a floor of a vehicle. The upper rail is fixed to a vehicle seat and supported on the lower rail to be slidable along a longitudinal direction of the lower rail. The male screw member has a male screw extending along the lower rail and is supported on one of the upper rail and the lower rail rotatively around a rotational center of the male screw. The female screw member has a female screw meshing with the male screw and is fixed onto the other of the upper rail and the lower rail. The rotary member integrally rotates with the male screw member. The swinging member is supported on one of the upper rail and the lower rail in a manner capable of swinging in a state in which rotation around the rotational center is restricted, rotatively supports the rotary member, and integrally swings with the rotary member. The receiving member is fixed onto one of the upper rail and the lower rail and supports the swinging member in a manner capable of swinging.

DETAILED DESCRIPTION

The following discloses an exemplary embodiment of the present invention. The configurations in the following embodiment disclosed, as well as the functions and results (effects) that are brought about by such configurations, are one example. The invention can also be implemented by configurations other than those disclosed in the following embodiment. Furthermore, according to the invention, it is possible to obtain at least one of various effects obtainable (including derivative effects) by the configurations.

In the respective drawings, directions are indicated for the sake of convenience. FR indicates the front in the vehicle front-and-rear direction, RR indicates the rear in the vehicle front-and-rear direction, RH indicates the right-hand side in the vehicle width direction, and LH indicates the left-hand side of the vehicle width direction.

Figure 1:
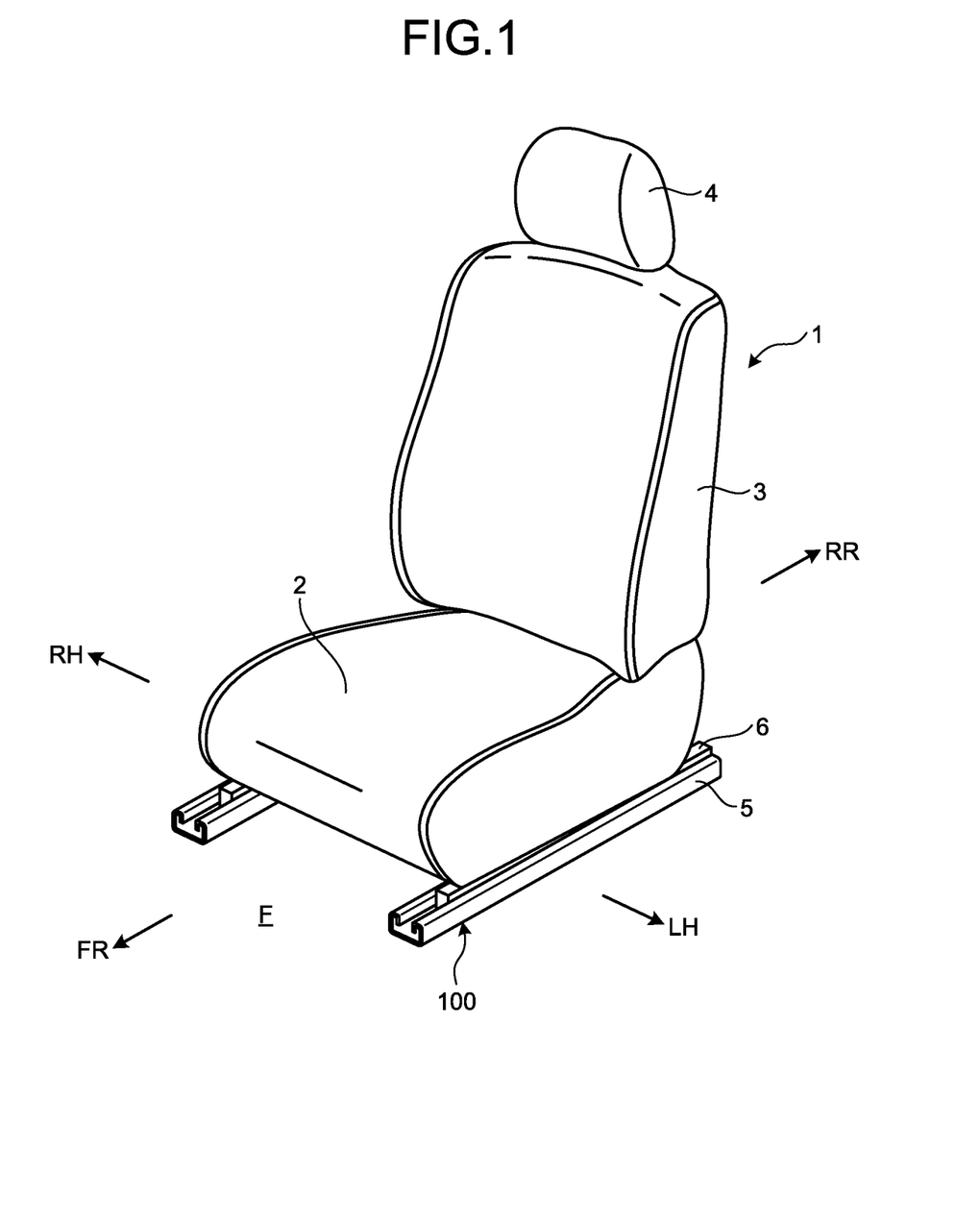
FIG. 1 is a perspective view illustrating a vehicle seat and a vehicle seat sliding device according to an embodiment.

FIG. 1 is a perspective view illustrating a vehicle seat 1 and a vehicle seat sliding device 100 according to an embodiment. As illustrated in FIG. 1, the vehicle seat 1 includes a seat cushion 2, a seat back 3 that extends upward from the rear portion of the seat cushion 2, and a headrest 4 that is attached to the upper end of the seat back 3.

Figure 2:
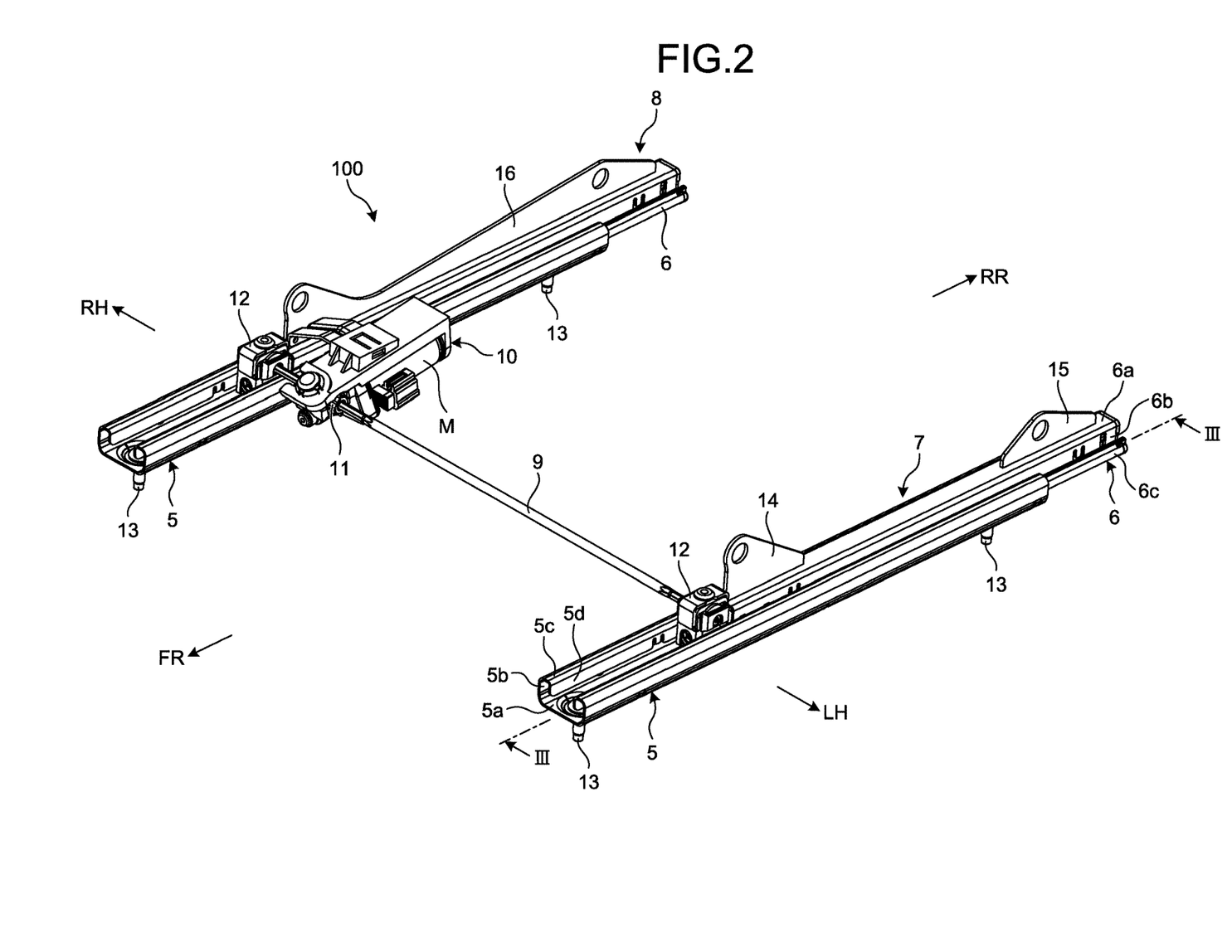
FIG. 2 is a perspective view illustrating the vehicle seat sliding device of FIG. 1.

FIG. 2 is a perspective view illustrating the vehicle seat sliding device 100 of FIG. 1. As illustrated in FIGS. 1 and 2, on a floor F of a vehicle, a left-side slide rail 7 and a right-side slide rail 8, both including a lower rail 5 and an upper rail 6, extend in the front-and-rear direction. The front-end portion and the rear end portion of the lower rail 5 are fixed onto the floor F via fixing bolts 13.

As illustrated in FIG. 2, the vehicle seat sliding device 100 is provided with the left-side slide rail 7 provided on the left-hand side of vehicle, the right-side slide rail 8 provided on the right-hand side of vehicle, a shaft 9 bridged between the left-side slide rail 7 and the right-side slide rail 8 and extending along the vehicle width direction, and a drive device 10 that rotates the shaft 9.

Figure 6:
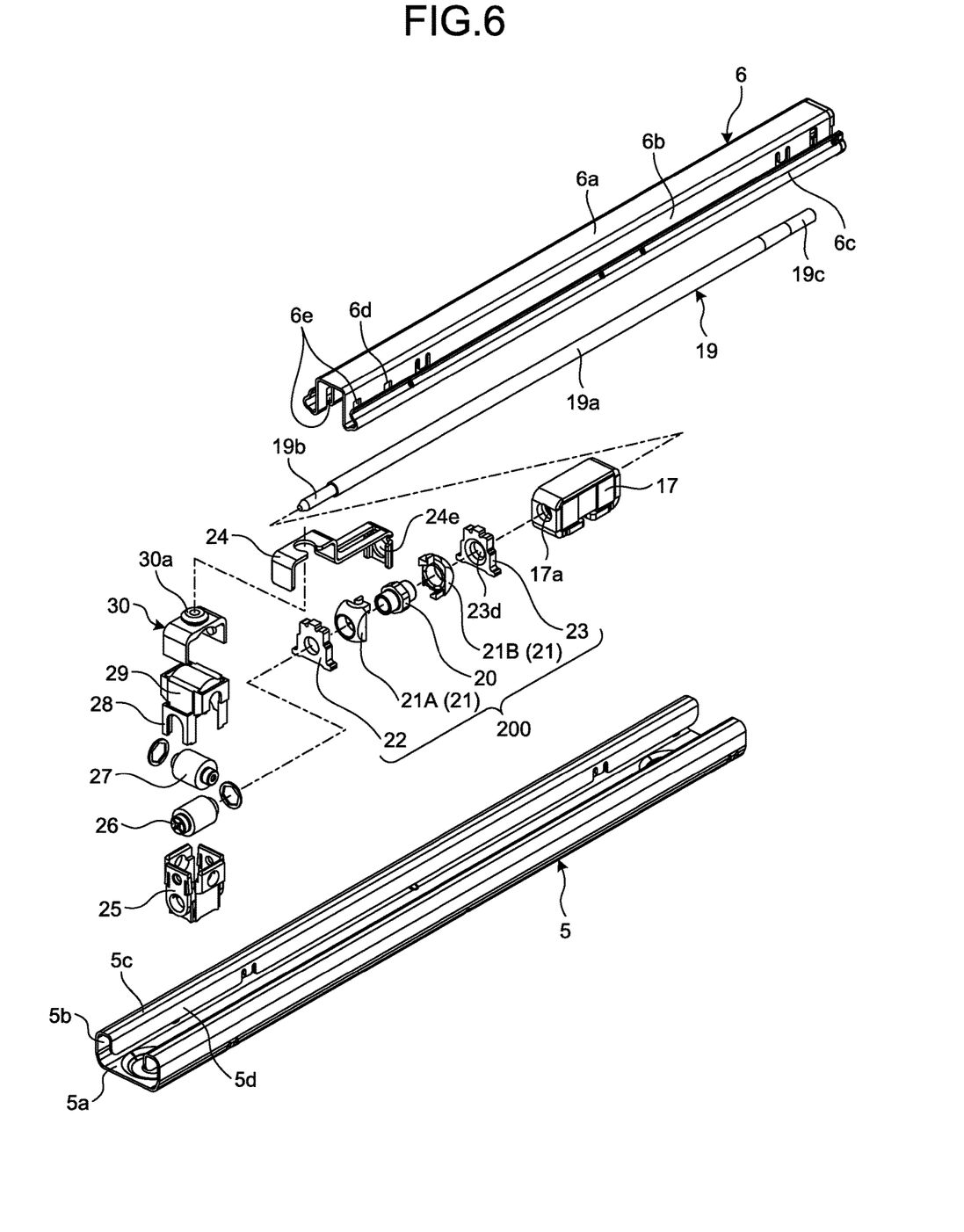
FIG. 6 is an exploded perspective view of the vehicle seat sliding device in the embodiment.

As illustrated in FIGS. 2 and 6, the lower rail 5 provided on each of the left-side slide rail 7 and the right-side slide rail 8 includes a bottom wall portion 5a that comes in contact with the floor F, outer wall portions 5b extending upward from the left and right ends of the bottom wall portion 5a, upper wall portions 5c extending toward the central side in the width direction of the lower rail 5 from the upper ends of the outer wall portions 5*b*, and inner wall portions 5*d* extending downward from the distal ends of the upper wall portions 5*c*. The upper rail 6 includes an upper wall portion 6*a*, lateral wall portions 6*b* extending downward from the left and right ends of the upper wall portion 6*a*, and folding portions 6*c* extending from the lower ends of the lateral wall portions 6*b* and bent outward in the width direction of the upper rail 6. The folding portions 6*c* of the upper rail 6 are inserted into gaps made up of the outer wall portions 5*b*, the upper wall portions 5*c*, and the inner wall portions 5*d* of the lower rail 5, and the upper rail 6 is supported in a manner slidable to the vehicle front-and-rear direction (longitudinal direction) of the lower rail 5. In the upper wall portion 6*a* of the upper rail 6, seat mounting brackets 14 and 15, or 16 are projecting upward. The upper rails 6 are fixed to the seat cushion 2 (see FIG. 1) via a seat cushion frame, not depicted, and the seat mounting brackets 14 and 15, or 16. The drive device 10 includes a motor M and the rotation of the motor M is transmitted to the shaft 9 via a first gear box 11. Both left and right end portions of the shaft 9 are rotatively coupled to screw rods (male screw members) 19 which will be described later via second gear boxes 12.

Figure 3:
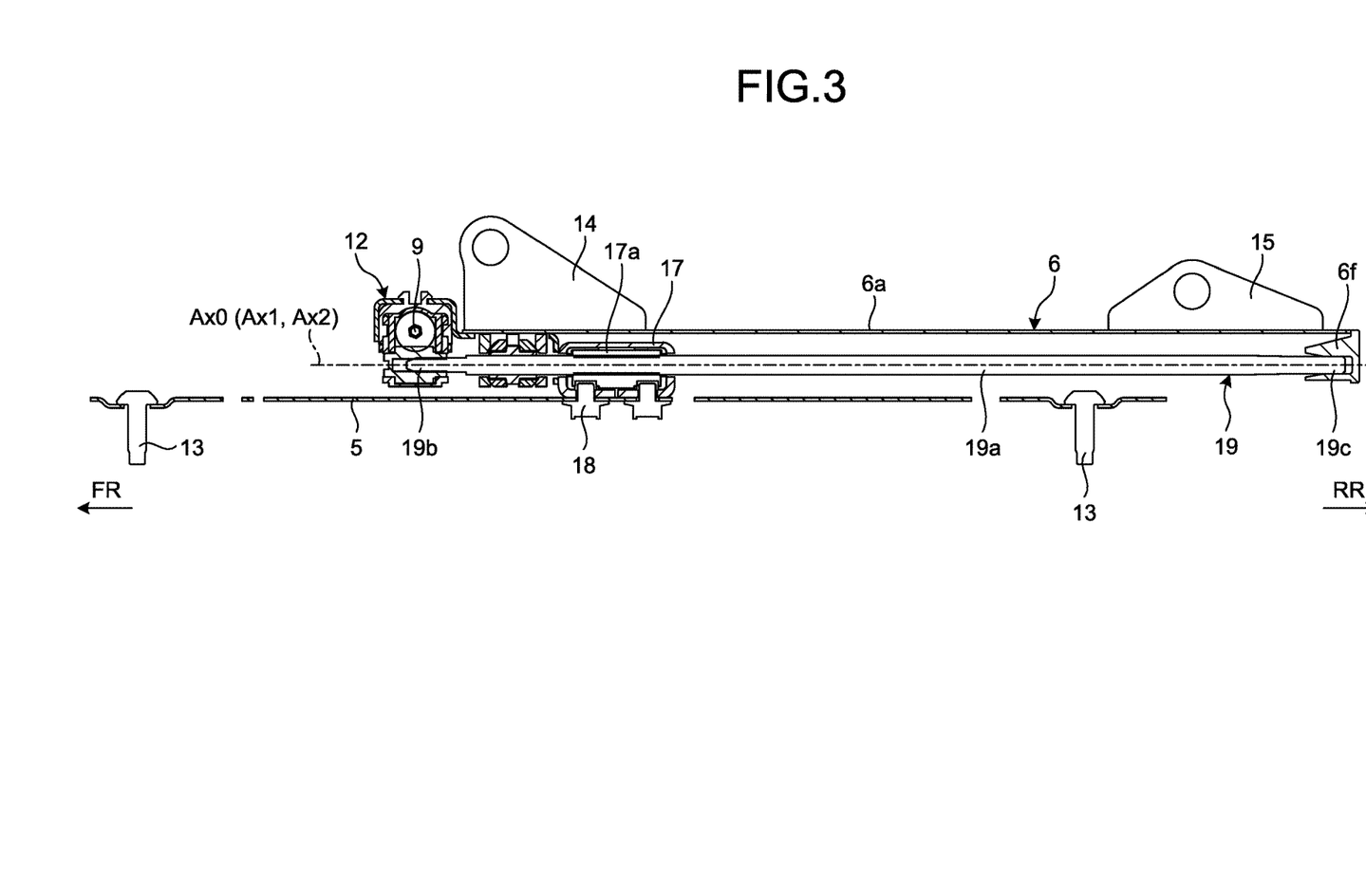
FIG. 3 is a cross-sectional view taken along the line of FIG. 2.
Figure 4:
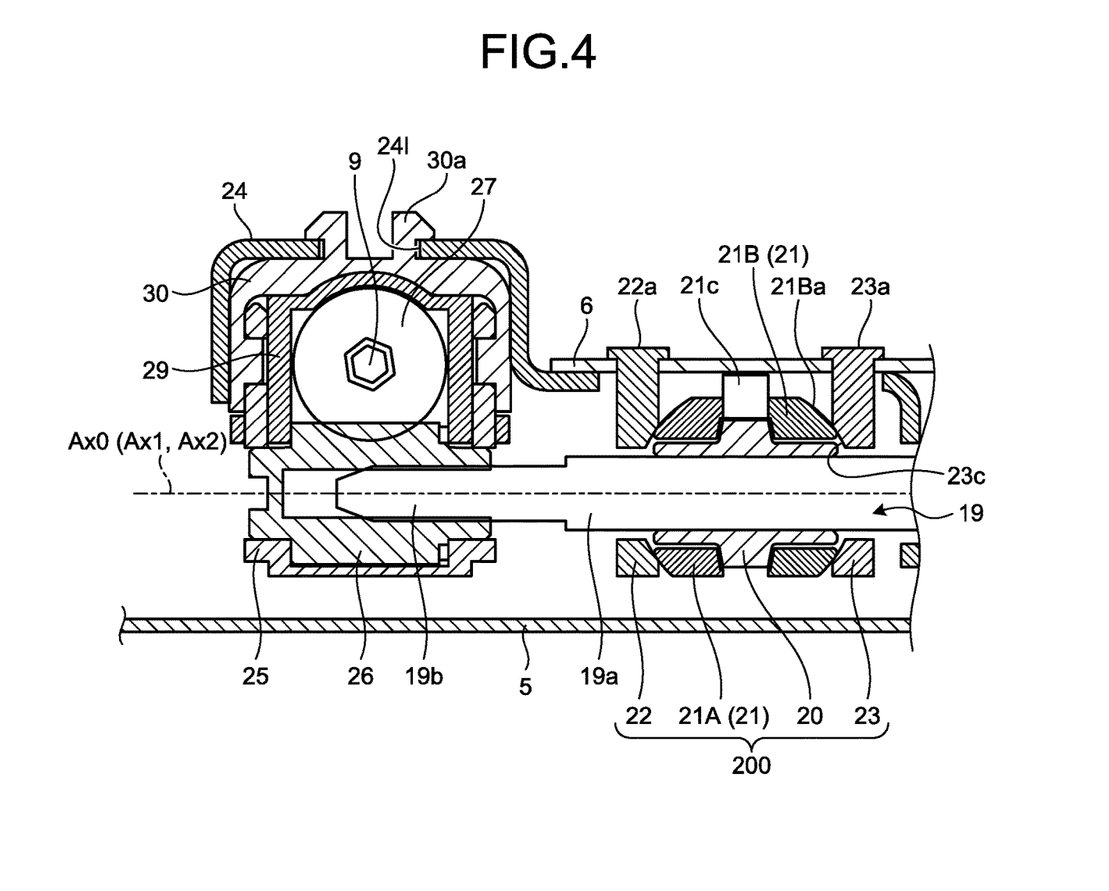
FIG. 4 is an enlarged cross-sectional view of a front-end portion of an upper rail in FIG. 3.
Figure 5:
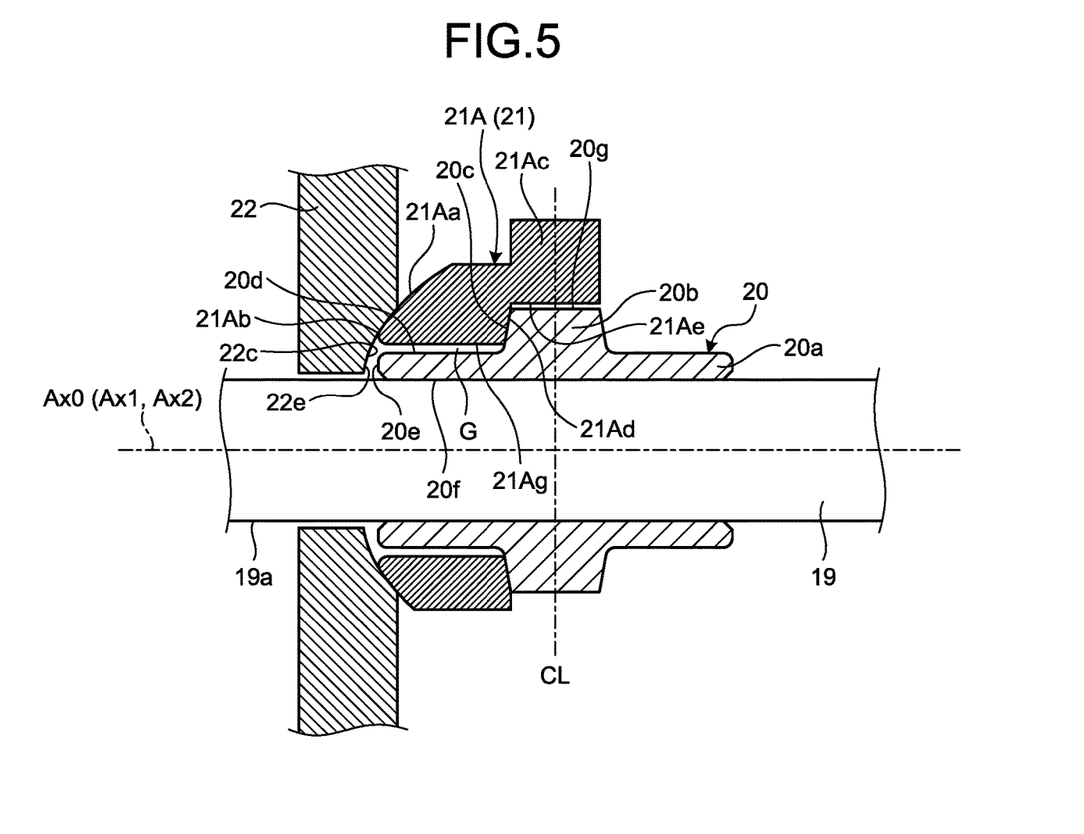
FIG. 5 is an enlarged cross-sectional view of a rotary member, a swinging member, and a receiving member in FIG. 4.
Figure 7:
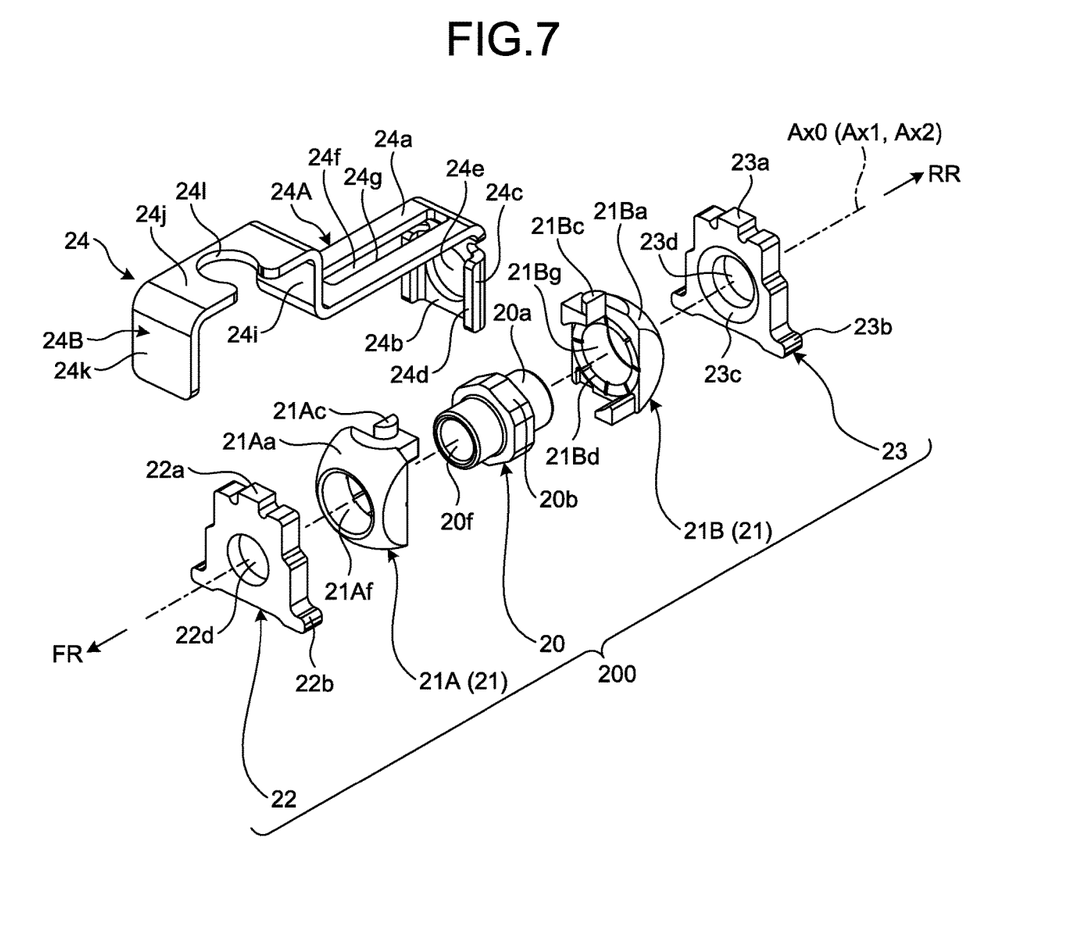
FIG. 7 is an exploded perspective view illustrating a swinging member assembly and a fixing bracket to which the swinging member assembly is assembled.

FIG. 3 is a cross-sectional view taken along the line of FIG. 2. FIG. 4 is an enlarged cross-sectional view of the front-end portion of the upper rail 6 in FIG. 3. FIG. 5 is an enlarged cross-sectional view of a rotary member 20, a swinging member 21, and a receiving member 22 in FIG. 4. FIG. 6 is an exploded perspective view of the vehicle seat sliding device 100 in the embodiment. FIG. 7 is an exploded perspective view illustrating a swinging member assembly 200 and a fixing bracket 24 to which the swinging member assembly 200 is assembled.

As illustrated in FIG. 3, on the bottom wall portion 5*a* of the lower rail 5, a female screw member 17 is fixed by bolts 18. On the female screw member 17, a through hole extending in the longitudinal direction (vehicle front-and-rear direction) is provided, and on the inner surface of the through hole, a female screw 17*a* is provided.

As illustrated in FIGS. 3, 4, and 6, on the upper rail 6, the screw rod 19 (male screw member) extending in the longitudinal direction (front-and-rear direction) of the upper rail 6 is rotatively supported. Specifically, as illustrated in FIGS. 3 and 6, the screw rod 19 includes a male screw portion 19*a* that is provided with a male screw extending along the lower rail 5 and the upper rail 6, a supporting portion 19*b* that is located on the front side of the male screw portion 19*a* and provided with serrations not depicted, and a supporting portion 19*c* that is provided on the rear side of the male screw portion 19*a* and the outer circumference of which is a smooth surface. As illustrated in FIG. 3, the supporting portion 19*c* is supported on a fixing portion 6*f* on the rear end of the upper rail 6. As illustrated in FIGS. 4 and 6, the supporting portion 19*b* on the front end of the screw rod 19 is fitted into a first helical gear 26. As illustrated in FIG. 3, the male screw portion 19*a* of the screw rod 19 is meshed with the female screw 17*a* of the female screw member 17. Accordingly, the screw rod 19 is rotatively supported around the rotational center (Ax0) of the male screw on the upper rail 6. The screw rod 19 is rotatively supported on the upper rail 6 and slides in the front-and-rear direction (axial direction of the rotational center of the screw rod 19) integrally with the upper rail 6.

As illustrated in FIGS. 4 and 6, at the front-end portion of the upper rail 6, a swinging member assembly 200 including a swinging member 21 is retained in a state of being inserted to the front-end portion of the screw rod 19. The swinging member assembly 200 is provided with a rotary member 20, the swinging member 21, and receiving members 22 and 23.

As illustrated in FIG. 5, the rotary member 20 includes a through hole 20*f* that runs through in the axial direction along the front-and-rear direction, the through hole 20*f* is provided with a female screw, and the female screw meshes with the male screw of the male screw portion 19*a* of the screw rod 19. In FIG. 5, CL indicates the center of the axial direction (front-and-rear direction) of the rotary member 20. The rotary member 20 includes a projecting portion 20*b* that is provided in the central portion in the front-and-rear direction (axial direction) and in a flange shape projecting in the radial direction intersecting (crossing) with the front-and-rear direction, and a cylindrical portion 20*a* that is in a cylindrical shape, extends toward the front and the rear in the axial direction from the projecting portion 20*b*, and lies along the outer circumference of the screw rod 19. On the front side of the projecting portion 20*b*, provided is a first sliding surface 20*c* that is a rotary surface around a first central axis (Ax1) along the rotational center (Ax0) of the screw rod 19 and that the diameter thereof is reduced toward the front (one side) in the axial direction of the first central axis (Ax1). On the upper side of the projecting portion 20*b*, provided is an outer circumferential surface 20*g* that is a rotary surface around the first central axis (Ax1) and that the diameter thereof along the axial direction of the first central axis (Ax1) is constant. An outer circumferential surface 20*d* of the cylindrical portion 20*a* is provided annularly along the outer circumference of the screw rod 19. The rotary member 20 is a metal component, for example.

The swinging member 21, as illustrated in FIG. 7, includes a first divided body 21A that is arranged on the front and a second divided body 21B that is arranged on the rear and having the same structure as that of the first divided body 21A. The rotary member 20 is supported by the first divided body 21A and the second divided body 21B so as to be sandwiched from the front and the rear. First, the first divided body 21A will be described in detail. On the upper surface of the first divided body 21A, a first divided protrusion 21Ac projecting upward is provided. Specifically, the first divided protrusion 21Ac of the first divided body 21A has a shape for which a cylinder is divided in half along the central axis. On the first divided body 21A, provided further is a through hole 21Af that runs through in the front-and-rear direction (axial direction). The inner circumferential surface of the through hole 21Af, as illustrated in FIG. 5, includes an inner circumferential surface 21Ag facing the outer circumferential surface 20*d* of the cylindrical portion 20*a*, a second sliding surface 21Ad facing the first sliding surface 20*c* of the projecting portion 20*b*, and an inner circumferential surface 21Ae facing the outer circumferential surface 20*g* of the projecting portion 20*b* of the rotary member 20. Specifically, the second sliding surface 21Ad is a rotary surface around a second central axis (Ax2) along the rotational center (Ax0) of the screw rod 19, the diameter thereof is reduced toward the front (one side) in the axial direction of the second central axis (Ax2) along the first sliding surface 20*c*, and rotationally slides on the first sliding surface 20*c*. On the front face of the first divided body 21A, provided is a third sliding surface 21Aa that is located outward in the radial direction of the rotational center (Ax0) than the cylindrical portion 20*a* of the rotary member 20, and is configured as a convex curve surface projecting toward the front (one side) of the axial direction of the second central axis (Ax2). The outer circumferential surface 20*d* of the cylindrical portion 20*a* in the rotary member 20 and the inner circumferential surface 21Ag of the first divided body 21A are spaced apart in the radial direction of the second central axis (Ax2) and a gap G is provided. The first divided body 21A and the second divided body 21B are resin components, for example.

As illustrated in FIG. 7, because the second divided body 21B also has the same structure as that of the first divided body 21A, a first divided protrusion 21Bc of the second divided body 21B also has the same shape as that of the first divided protrusion 21Ac of the first divided body 21A, and when the respective first divided protrusions 21Ac and 21Bc are brought face to face, a cylindrical first protrusion 21c (see FIG. 4) is formed. As just described, the swinging member 21 includes the first divided body 21A, and the second divided body 21B that has the same structure as that of the first divided body 21A and is in an orientation obtained by inverting the first divided body 21A around the axis orthogonal to the second central axis (Ax2). The second divided body 21B includes a second sliding surface 21Bd.

The receiving members 22 and 23 extend in the direction orthogonal to (intersecting with) the rotational center (Ax0) of the screw rod 19. Specifically, a second protrusion 22a that projects upward is provided on the upper surface, a left-and-right pair of lower side protrusions 22b that are projecting toward the lateral side are provided on the lower end portion, and a through hole 22d through which the screw rod 19 is inserted is provided in the middle of the up-and-down direction. As illustrated in FIG. 5, the receiving member 22 is configured as a concave curve surface lying along the third sliding surface 21Aa and being recessed toward the front (one side) of the axial direction of the second central axis (Ax2) and includes a fourth sliding surface 22c that slides on the third sliding surface 21Aa. A first end portion 20e of the axial direction of the first central axis (Ax1) of the cylindrical portion 20a and a second end portion 21Ab of the axial direction of the second central axis (Ax2) of the third sliding surface 21Aa that is a convex curve surface are arranged in juxtaposition in the radial direction of the rotational center (Ax0). The first end portion 20e and an end portion 22e of the rotational center (Ax0) side in the fourth sliding surface 22c face at a position close to each other leaving a gap in the axial direction (front-and-rear direction) of the second central axis (Ax2). As illustrated in FIG. 7, on the receiving member 23 also, a through hole 23d through which the screw rod 19 is inserted and a fourth sliding surface 23c that slides on a third sliding surface 21Ba of the second divided body 21B are provided. The receiving members 22 and 23 are metal components, for example.

Figure 8:
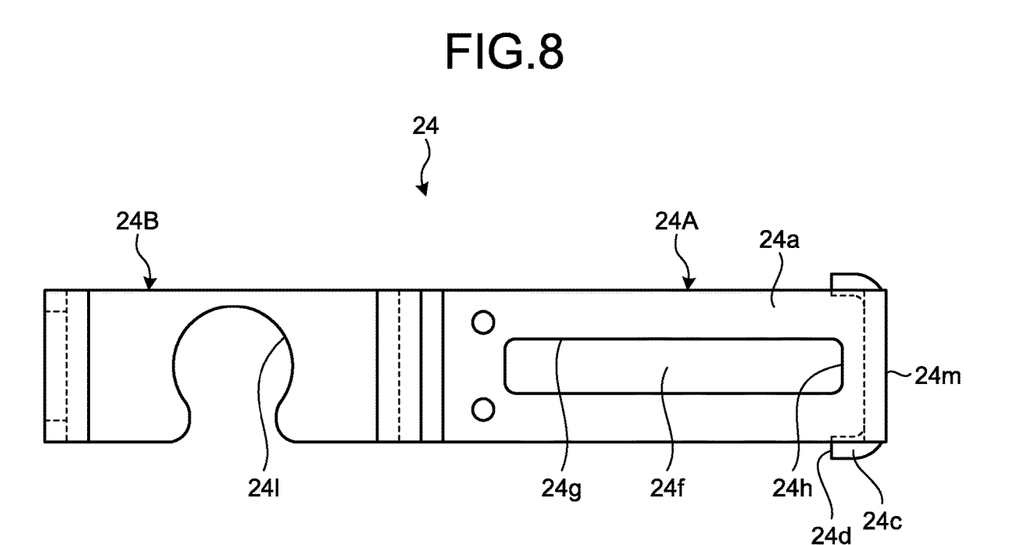
FIG. 8 is a plan view of the fixing bracket.

FIG. 8 is a plan view of the fixing bracket 24. As illustrated in FIGS. 7 and 8, the fixing bracket 24 (bracket) includes an assembly retaining portion 24A located on the rear side and a gear-box retaining portion 24B located on the front side. The fixing bracket 24 is a metal component, for example.

As illustrated in FIG. 7, the assembly retaining portion 24A includes a first wall 24a that is spaced apart upward from the rotational center (Ax0) and extends in the front-and-rear direction (axial direction of the rotational center (Ax0)), a second wall 24b that is bent at the rear end of the first wall 24a and projects downward (radial direction), and supporting walls 24c that are bent at both left and right ends of the second wall 24b, are projecting toward the front (axial direction of the rotational center (Ax0)), and support at a tips 24d thereof the receiving member 23 in the front-and-rear direction. On the second wall 24b, a through hole 24e through which the screw rod 19 is inserted is provided. On the first wall 24a, an elongated hole 24f (opening) extending in the front-and-rear direction (axial direction of the rotational center (Ax0)) is provided. As illustrated in FIG. 8, the front-and-rear position of a rear end 24h of an inner circumferential edge 24g (edge of the opening) of the elongated hole 24f is arranged at the position equivalent to the front-and-rear position of the tips 24d of the supporting walls 24c in juxtaposition in the up-and-down direction.

As illustrated in FIG. 7, the gear-box retaining portion 24B includes a third wall 24i that extends upward from the front end of the first wall 24a, a fourth wall 24j that is bent at the upper end of the third wall 24i and extends toward the front, and a fifth wall 24k that extends downward from the front end of the fourth wall 24j. On the fourth wall 24j, a circular cutout 24l is provided. The gear box, as illustrated in FIGS. 4 and 6, includes the first helical gear 26 that is provided at the front end of the screw rod 19, a second helical gear 27 that is provided at the distal end of the shaft 9 and is arranged orthogonal to the first helical gear 26, an upper-side retaining bracket 29 that covers the second helical gear 27 from the upper side, a lower-side retaining bracket 25 that covers the first helical gear 26, the second helical gear 27, a supporting bracket 28, and the upper-side retaining bracket 29 from the lower side, and a coupling bracket 30 that covers the upper portion of the lower-side retaining bracket 25 from the upper side. As a protrusion portion 30a provided on the upper portion of the coupling bracket 30 is fitted into the cutout 24l of the fourth wall 24j, the gear box is retained by the gear-box retaining portion 24B of the fixing bracket 24.

With reference to FIG. 7, the procedure to make the swinging member assembly retain by the assembly retaining portion of the fixing bracket will be briefly described. The swinging member assembly 200 includes the rotary member 20 that is arranged on the central side in the front-and-rear direction (axial direction of the rotational center (Ax0)), the swinging member 21 that includes the first divided body 21A and the second divided body 21B that support the rotary member 20 so as to sandwich it from the front and the rear of the rotary member 20, and a pair (two) of the front and rear receiving members 22 and 23 that support the swinging member 21 so as to sandwich it from the front and the rear in the axial direction of the swinging member 21.

First, by inserting a second protrusion 23a of the receiving member 23 into the elongated hole 24f of the first wall 24a of the fixing bracket 24, and by sliding it toward the rear, the receiving member 23 is made to abut on the tips 24d of the supporting walls 24c. Next, the rotary member 20 is sandwiched from the front and the rear with the first divided body 21A and the second divided body 21B, and the respective first divided protrusions 21Ac and 21Bc of the first divided body 21A and the second divided body 21B are brought face to face, thereby forming the cylindrical first protrusion 21c (see FIG. 4). Then, by inserting the first protrusion 21c into the elongated hole 24f, and by sliding it toward the rear, the third sliding surface 21Ba (see FIG. 4) of the second divided body 21B is made to abut on the fourth sliding surface 23c (see FIG. 4) of the receiving member 23. Moreover, by inserting the second protrusion 22a of the receiving member 22 into the elongated hole 24f, and by sliding it toward the rear, the fourth sliding surface 22c of the receiving member 22 is made to abut on the third sliding surface 21Aa of the first divided body 21A. Then, the second protrusion 22a of the receiving member 22 and the second protrusion 23a of the receiving member 23 are squashed downward and are swaged to the elongated hole 24f. Accordingly, the swinging member assembly 200 can be retained by the assembly retaining portion 24A of the fixing bracket 24.

As illustrated in FIG. 4, the rotary member 20 is supported by the first divided body 21A and the second divided body 21B so as to be sandwiched from the front-and-rear direction, and the first divided body 21A and the second divided body 21B are supported by the receiving members 22 and 23 so as to be sandwiched from the front-and-rear direction. As in the foregoing, the female screw of the through hole 20f of the rotary member 20 is meshed with the male screw of the male screw portion 19a of the screw rod 19. Thus, the rotary member 20 is configured to be integrally rotatable with the screw rod 19.

After this, as illustrated in FIG. 6, while rotating the front-end portion of the male screw portion 19a of the screw rod 19 to mesh with the female screw 17a of the female screw member 17, the screw rod 19 is kept rotated so as to project from the female screw member 17. The projecting front end portion of the screw rod 19 is inserted into the through hole 24e of the second wall 24b of the fixing bracket 24 and into the swinging member assembly 200 illustrated in FIG. 6. Specifically, the front end portion of the screw rod 19 is inserted into the through hole 23d of the receiving member 23, the screw rod 19 is rotated with respect to the rotary member 20, and the male screw of the screw rod 19 is made to mesh with the female screw of the rotary member 20 while squashing the male screw of the screw rod 19 and the female screw of the rotary member 20 the teeth of which are smaller than those of the male screw of the screw rod 19. Thus, the rotary member 20 integrally rotates with the screw rod 19. Next, the front-end portion of the screw rod 19 is made to project from the through hole 22d of the receiving member 22. Thereafter, the first helical gear 26 is serration-fitted to the supporting portion 19b of the screw rod 19. Accordingly, the swinging member assembly 200 can be provided on the screw rod 19. Then, by inserting the lower side protrusions 23b of the receiving member 23 into rear-side grooves 6d at the front-end portion of the upper rail 6 illustrated in FIG. 6, and by inserting the lower side protrusions 22b of the receiving member 22 into front-side grooves 6e at the front-end portion of the upper rail 6, positioning of the front-and-rear position of the swinging member assembly 200 is made. Then, the fixing bracket 24 is fixed to the upper rail 6.

As just described, on the fixing bracket 24 illustrated in FIG. 7, the elongated hole 24f (opening) that accommodates the first protrusion 21c in a manner capable of swinging is provided, and by the inner circumferential edge 24g of the elongated hole 24f, the rotation of the first protrusion 21c around the rotational center (Ax0) is restricted. The receiving members 22 and 23 are fixed to the fixing bracket 24 in a state in which the second protrusions 22a and 23a are inserted into the elongated hole 24f. Moreover, the swinging member 21 is supported on the upper rail 6 in a manner capable of swinging in a state in which the rotation around the second central axis (Ax2) is restricted, rotatively supports the rotary member 20, and integrally swings with the rotary member 20 and the screw rod 19.

Next, sliding of the upper rail 6 with respect to the lower rail 5 will be described. First, as illustrated in FIG. 2, when the motor M of the drive device 10 is rotationally driven, the rotational drive force of the motor M is transmitted to the shaft 9 via the first gear box 11 and the shaft 9 is rotated. As illustrated in FIG. 6, at the distal end of the shaft 9, the second helical gear 27 is fixed, and at the front end of the screw rod 19, the first helical gear 26 that meshes with the second helical gear 27 is fixed. Thus, the screw rod 19 is rotated in synchronization with the shaft 9. As illustrated in FIG. 3, because the male screw portion 19a of the screw rod 19 is meshed with the female screw 17a of the female screw member 17 that is fixed to the lower rail 5, when the screw rod 19 is rotated, the upper rail 6 on which the screw rod 19 is integrally supported slides relatively with respect to the lower rail 5.

Because the rotary member 20 integrally rotates with the screw rod 19, as illustrated in FIG. 5, the first sliding surface 20c in the rotating rotary member 20 rotationally slides on the second sliding surface 21Ad in the swinging member 21 for which the rotation is restricted. On the inner circumferential surfaces 21Ag and 21Bg of the swinging member 21, the gaps G along the radial direction are provided between the inner circumferential surfaces 21Ag and 21Bg and the outer circumferential surfaces 20d of the cylindrical portion 20a in the rotary member 20. Thus, the positioning of the swinging member 21 with respect to the rotary member 20 can be made by the first sliding surface 20c and the second sliding surface 21Ad. Furthermore, the rotation around the second central axis (Ax2) of the swinging member 21 and the receiving members 22 and 23 is restricted, and the third sliding surface 21Aa is made slidable with respect to the fourth sliding surface 22c.

As in the foregoing, as illustrated in FIG. 7, in the present embodiment, for example, the rotary member 20 that integrally rotates with the screw rod 19 (male screw member), the swinging member 21 that is supported on the upper rail 6 in a manner capable of swinging in a state in which the rotation around the rotational center (Ax0) is restricted and that rotatively supports the rotary member 20 and integrally swings with the rotary member 20, and the receiving members 22 and 23 that are fixed to the upper rail 6 and support the swinging member 21 in a manner capable of swinging are provided. Thus, according to the present embodiment, because the swinging member 21 integrally swings with the rotary member 20 that integrally rotates with the screw rod 19, even when the screw rod 19 is curved along the front-and-rear direction (rotational center direction), it is possible to rotate the screw rod 19 more smoothly and to slide the vehicle seat 1 more smoothly with respect to the floor F. Furthermore, because the swinging member 21 is a separate member from the rotary member 20 and the rotation around the rotational center (Ax0) of the swinging member 21 is restricted, it is possible to suppress the rotational slide around the rotational center (Ax0) of the third sliding surface 21Aa of the swinging member 21 with respect to the fourth sliding surface 22c of the receiving member 22. Accordingly, it is possible to suppress the abrasion in the sliding portions between the third sliding surface 21Aa and the fourth sliding surface 22c.

The rotary member 20, as illustrated in FIG. 5, includes the first sliding surface 20c the diameter of which is reduced toward the front (one side) in the axial direction of the rotational center (Ax0), and the swinging member 21 includes the second sliding surface 21Ad that lies along the first sliding surface 20c, has the diameter that is reduced toward the front (one side) in the axial direction, and rotationally slides on the first sliding surface 20c. The inner circumferential surface 21Ag and the outer circumferential surface 20d of the cylindrical portion 20a are spaced apart in the radial direction of the second central axis (Ax2) and the gap G is provided. Accordingly, the positioning of the swinging member 21 with respect to the rotary member 20 can be made by the first sliding surface 20c and the second sliding surface 21Ad.

The rotary member 20 includes the cylindrical portion 20a. The swinging member 21 includes the third sliding surface 21Aa that is configured as a convex curve surface projecting toward the front (one side of the axial direction) of front-and-rear direction of the rotational center, and the receiving member 22 includes the fourth sliding surface 22c that is configured as a concave curve surface being recessed toward the front, and that slides on the third sliding surface 21Aa. As just described, because the third sliding surface 21Aa is slidable on the fourth sliding surface 22c, the swinging member 21 is able to swing integrally with the rotary member 20. The first end portion 20e on the front (axial direction) of the cylindrical portion 20a and the end portion 22e of the rotational center (Ax0) side in the fourth sliding surface 22c face close to each other leaving a gap in the front-and-rear direction (axial direction). Thus, for example, when the rotary member 20 has moved toward the front as a collision load is input to the vehicle and the first end portion 20e has abutted on the end portion 22e of the fourth sliding surface 22c, the collision load is likely to be transmitted to the receiving member 22 from the rotary member 20. After this, the collision load is likely to be transmitted to the upper rail 6 via the fixing bracket 24 from the receiving member 22. As just described, for example, the collision load is more likely to be transmitted to the upper rail 6 via the swinging member assembly 200.

On the upper rail 6, the fixing bracket 24 (bracket) is fixed, and on the fixing bracket 24, the receiving members 22 and 23 are fixed and the swinging member 21 is supported in a manner capable of swinging. Accordingly, it is possible to configure the receiving members 22 and 23 and the swinging member 21 as the swinging member assembly 200 collectively, and it is possible to provide the swinging member assembly 200 on the fixing bracket 24.

The swinging member 21 is provided with the first protrusion 21c, the receiving members 22 and 23 are provided with the second protrusions 22a and 23a, and the fixing bracket 24 is provided with the elongated hole 24f (opening). The first protrusion 21c of the swinging member 21 is accommodated in the elongated hole 24f in a manner capable of swinging, and the second protrusions 22a and 23a of the receiving members 22 and 23 are inserted into and fixed to the elongated hole 24f. As just described, the swinging member 21 and the receiving members 22 and 23 can be easily provided to the fixing bracket 24 via the elongated hole 24f (opening).

The opening is the elongated hole 24f that is long in the front-and-rear direction (axial direction). Accordingly, the rotary member 20, the swinging member 21, and the receiving members 22 and 23 can be provided to the fixing bracket 24 in a state of being juxtaposed without a gap along the elongated hole 24f.

The fixing bracket 24 (bracket) includes the second wall 24b that projects downward (radial direction of the rotational center) from the first wall 24a, and the supporting walls 24c that project toward the front (axial direction) from the second wall 24b and support the receiving member 23 in the front-and-rear direction (axial direction) at the tips 24d of the supporting walls 24c. Accordingly, because the receiving member 23 is able to abut on the tips 24d of the supporting walls 24c, as illustrated in FIG. 8, the front-and-rear position of the rear end 24h of the inner circumferential edge 24g of the elongated hole 24f is arranged toward the front than a rear end 24m of the first wall 24a. That is, in the first wall 24a, because the rear end 24h of the elongated hole 24f is not extending up to the rear end 24m of the first wall 24a, it is possible to suppress the strength reduction of the first wall 24a due to providing of the elongated hole 24f.

The swinging member 21 (first divided body 21A, second divided body 21B) supports the rotary member 20 so as to sandwich it in the front-and-rear direction (axial direction) of the rotational center, and the two receiving members 22 and 23 that sandwich the swinging member 21 in the front-and-rear direction (axial direction) are provided. As just described, because the rotary member 20, the swinging member 21, and the two receiving members 22 and 23 can be supported collectively on the fixing bracket 24, it is possible to improve the efficiency of assembly workability.

The swinging member 21 includes the first divided body 21A, and the second divided body 21B that has the same structure as that of the first divided body 21A and is in an orientation obtained by inverting the first divided body 21A around the axis orthogonal to the axis of the rotational center. As just described, because the first divided body 21A and the second divided body 21B have the same structure, the mold to form the first divided body 21A and the second divided body 21B can be of one type. Accordingly, it is possible to keep mold cost lower and it is possible to achieve cost reduction.

While the embodiment of the present invention has been exemplified in the foregoing, the above-described embodiment is a mere example and is not intended to limit the scope of the invention. The present invention can be implemented in various other forms, and without departing from the scope of the invention, various omissions, substitutions, combinations, and modifications can be made. Those various embodiments and the modifications thereof would fall within the scope and spirit of the invention and would fall within the scope of the invention stated in the appended claims and the scope of the equivalents thereof. In addition, the specifications such as the respective configurations and shapes (the structure, type, direction, shape, size, length, width, thickness, height, number, arrangement, position, material, and the like) can be implemented by changing as appropriate.

For example, in the foregoing embodiment, on the first sliding surface 20c of the rotary member 20 and the second sliding surface 21Ad of the first divided body 21A, the diameter is reduced toward the front (one side) of the axial direction of the rotational center (Ax0). However, the first sliding surface 20c and the second sliding surface 21Ad may be configured such that the diameter is expanded toward the front of the axial direction of the rotational center (Ax0).

In the present embodiment, the screw rod 19 is provided on the upper rail 6 and the female screw member 17 is provided on the lower rail 5. However, the screw rod 19 may be provided on the lower rail 5 and the female screw member 17 may be provided on the upper rail 6.

Moreover, in the drawings, the rotational center (Ax0) of the screw rod 19, the first central axis (Ax1) of the rotary member 20, and the second central axis (Ax2) of the swinging member 21 have been illustrated to be of the same axis for the convenience sake. However, the rotational center (Ax0), the first central axis (Ax1), and the second central axis (Ax2) may be not coinciding in the radial direction.

In the vehicle seat sliding device in the present invention, for example, because the swinging member integrally swings with the rotary member that integrally rotates with the male screw member, even when the male screw member is curved along the rotational center direction, the male screw member rotates smoothly, and the seat can slide more smoothly with respect to the floor.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicle seat sliding device comprising:
a lower rail fixed to a floor of a vehicle;
an upper rail fixed to a vehicle seat and supported on the lower rail to be slidable along a longitudinal direction of the lower rail;
a male screw member that has a male screw extending along the lower rail and is supported on one of the upper rail and the lower rail rotatively around a rotational center of the male screw;
a female screw member that has a female screw meshing with the male screw and is fixed onto the other of the upper rail and the lower rail;
a rotary member that integrally rotates with the male screw member;
a swinging member that is supported on one of the upper rail and the lower rail in a manner capable of swinging in a state in which rotation around the rotational center is restricted, rotatively supports the rotary member, and integrally swings with the rotary member; and
a receiving member that is fixed onto one of the upper rail and the lower rail and supports the swinging member in a manner capable of swinging.

2. The vehicle seat sliding device according to claim 1, wherein
the rotary member includes a first sliding surface that is a rotary surface around a first central axis along the rotational center, the first sliding surface having a diameter expanded or reduced toward one or the other side of an axial direction of the rotational center, and
the swinging member includes a second sliding surface that is a rotary surface around a second central axis along the rotational center, the second sliding surface having a diameter expanded or reduced toward one or the other side of the axial direction along the first sliding surface and rotationally sliding on the first sliding surface.

3. The vehicle seat sliding device according to claim 1, wherein
the rotary member includes a cylindrical portion that lies along an outer circumference of the male screw member,
the swinging member includes a third sliding surface that is located outward of a radial direction of the rotational center than the cylindrical portion and is configured as a convex curve surface projecting toward one or the other side of an axial direction of the rotational center,
the receiving member includes a fourth sliding surface that is configured as a concave curve surface that lies along the third sliding surface and is recessed toward one or the other side of the axial direction of the rotational center, and that slides on the third sliding surface,
an outer circumferential surface of the cylindrical portion and an inner circumferential surface of the swinging member facing the outer circumferential surface are juxtaposed leaving a gap in a radial direction of the rotational center, and
a first end portion in the axial direction of the cylindrical portion and the fourth sliding surface face each other leaving a gap in the axial direction.

4. The vehicle seat sliding device according to claim 1, wherein
the male screw member is rotatively supported on the upper rail and slides in an axial direction of the rotational center integrally with the upper rail, and
on the upper rail, a bracket on which the receiving member is fixed and that supports the swinging member in a manner capable of swinging is fixed.

5. The vehicle seat sliding device according to claim 4, wherein
the swinging member is provided with a first protrusion,
the bracket is provided with an opening that accommodates the first protrusion in a manner capable of swinging,
rotation around the rotational center of the first protrusion is restricted by an edge of the opening,
the receiving member is provided with a second protrusion, and
the receiving member is fixed to the bracket in a state in which the second protrusion is inserted into the opening.

6. The vehicle seat sliding device according to claim 5, wherein the opening is an elongated hole that is long in the axial direction.

7. The vehicle seat sliding device according to claim 4, wherein the bracket includes
a first wall spaced apart from the rotational center and extending along the rotational center,
a second wall projecting in a radial direction of the rotational center from the first wall, and
a supporting wall projecting in the axial direction from the second wall and supporting at a tip of the supporting wall the receiving member in the axial direction.

8. The vehicle seat sliding device according to claim 1, wherein
the swinging member supports the rotary member so as to sandwich the rotary member in an axial direction of the rotational center, and
the vehicle seat sliding device comprises two of the receiving members configured to sandwich the swinging member in the axial direction.

9. The vehicle seat sliding device according to claim 8, wherein the swinging member includes a first divided body, and a second divided body that has a same structure as that of the first divided body and is in an orientation obtained by inverting the first divided body around an axis orthogonal to the rotational center.

10. The vehicle seat sliding device according to claim 1, wherein the swinging member is supported on one of the upper rail and the lower rail in a manner capable of swinging except swinging around the rotational center.

* * * * *